United States Patent [19]

Goldsmith et al.

[11] Patent Number: 5,120,576
[45] Date of Patent: * Jun. 9, 1992

[54] IMPREGNATING POROUS INORGANIC MEMBRANE WITH REACTIVE INORGANIC BINDER

[75] Inventors: Robert R. Goldsmith, Belmont; Bruce A. Bishop, Cambridge, both of Mass.

[73] Assignee: CeraMem Separations Limited Partnership, Waltham, Mass.

[*] Notice: The portion of the term of this patent subsequent to Jan. 8, 2008 has been disclaimed.

[21] Appl. No.: 636,065

[22] Filed: Dec. 28, 1990

Related U.S. Application Data

[63] Continuation-in-part of Ser. No. 198,195, May 24, 1988, Pat. No. 4,983,423.

[51] Int. Cl.⁵ ............................................. B05D 5/00
[52] U.S. Cl. ........................................ 427/245; 427/247; 427/253; 427/380; 427/419.2; 427/419.3; 427/419.7
[58] Field of Search ............... 427/230, 244, 245, 247, 427/376.2, 380, 383.3, 383.5, 343, 344, 419.2, 419.3, 255

[56] References Cited

U.S. PATENT DOCUMENTS

| 4,390,455 | 6/1983 | Henne et al. | 427/245 |
| 4,692,354 | 9/1987 | Asaeda et al. | 427/244 |
| 4,738,874 | 4/1988 | Berardo et al. | 427/244 |
| 4,880,544 | 11/1989 | Barone | 427/245 |
| 4,980,069 | 12/1990 | Gauger | 427/245 |

FOREIGN PATENT DOCUMENTS

1155420  6/1969  United Kingdom ............... 427/245

*Primary Examiner*—Janyce Bell
*Attorney, Agent, or Firm*—Richard P. Crowley

[57] ABSTRACT

A process for forming a porous inorganic membrane on a porous support is provided. The support is coated with refractory particles which sinter at a first temperature. The coating then is impregnated with an inorganic binder which reacts at a second temperature, lower than the first temperature. The impregnated, coated support then is processed at a temperature at least as high as the second temperature, but less than the first temperature.

18 Claims, No Drawings

IMPREGNATING POROUS INORGANIC MEMBRANE WITH REACTIVE INORGANIC BINDER

RELATED APPLICATION

This application is a continuation-in-part of U.S. patent application Ser. No. 07/198,195, filed May 24, 1988 now U.S. Pat. No. 4,983,423, by Robert L. Goldsmith, the entire disclosure of which is incorporated herein by reference.

FIELD OF INVENTION

This invention relates to a method of forming a porous inorganic membrane of refractory particles, and more particularly to such a membrane whose particles are bonded by an inorganic binder which reacts, by sintering or chemical reaction, at a temperature below the sintering temperature of the refractory particles.

BACKGROUND OF INVENTION

There are an increasing number of applications for porous coatings. In the field of membrane separations, thin, porous membranes deposited on porous supports are widely used for microfiltration and ultrafiltration of liquid media and for gas separations.

There are several types of inorganic membranes: metallic membranes, glass membranes, inorganic polymer membranes, and ceramic membranes. Ceramic membranes in particular provide high thermal stability, chemical stability, and wear resistance.

Ceramic membranes are porous and usually have a composite structure. The structure consists of a macroporous support for mechanical strength onto which are coated one or more thin ceramic layers which perform the actual separation. When more than one layer is employed, the layers are coated sequentially onto the support, with layer pore size decreasing with the successive application of the layers.

Porous support materials include alumina, cordierite, mullite, silica, spinel, zirconia, other refractory oxides and various oxide mixtures, carbon, sintered metals (stainless steel or nickel), and silicon carbide. Ceramic materials for membrane layers include silicon carbide, silicon nitride, and most commonly, ceramic oxides. Such ceramic oxides include silica, alumina, zirconia, zircon, and titania, and in some instances, mixtures of the above. Alumina, zirconia, and silicon carbide are found in commercially available membrane devices.

A preferred method of coating involves slip casting of suspensions of ceramic particles or inorganic colloids onto a porous support. In the slip-casting process, the porous support is brought into contact with the slip, for example, by filling a cavity to be coated, and after a few seconds the slip is drained from the cavity. Due to capillarity in the support, the liquid medium (the "vehicle") of the slip is aspirated into the porous support, and particles or colloids in the slip of a size comparable to or larger than the pores are filtered to form a cake at the support interface.

An alternative method of coating layers of ceramic particles or inorganic colloids onto a porous support is filtration.

In filtration, a suspension of particles or colloids is filtered by the porous support in either a normal filtration mode or in a cross-flow filtration mode. Membranes coated by cross-flow filtration are also known as dynamic membranes.

The layers of ceramic particles or inorganic colloids coated onto the porous support by slip casting or filtration can be fired at an elevated temperature to sinter the particles together, thus obtaining a strong, stable porous ceramic membrane.

Several considerations and limitations are important in slip casting thin porous ceramic membrane layers. The porous support usually has a pore size of 10 to 20 microns.

Accordingly, the initial layer or layers are comprised of ceramic particles of size larger than 1 micron. Ceramic particles used to form such coatings are normally of a single composition and have narrow particle size distributions. These characteristics lead to a requirement for sintering at a relatively high temperature. Alpha-alumina microfilters, for example, are typically fired at 1,500° C. to 1,600° C. Careful control of the time-temperature profile to achieve the desired layer porosity and pore size is important.

The high sintering temperatures for refractory ceramic particles limit the selection of support materials. For example, porous cordierite has a melting point of about 1,450° C. and cannot be used as a support for alpha alumina particles above 1 micron in size, which require a sintering temperature in excess of 1,500° C.

Further, a large difference in the coefficient of expansion between the ceramic particles and the support material cannot be tolerated. On firing and cooldown, especially if the ceramic particles sinter at an elevated temperature, crazing or peeling of the membrane coating can impair its separation capability. For example, alpha-alumina and cordierite have coefficients of expansion of $7-8 \times 10$-6/ C and $1.0-1.2 \times 10$-6/ C, respectively. Were it possible to achieve coatings of alpha-alumina sintered at a high temperature on a porous cordierite support, they could be expected to craze on cooldown after sintering.

Further, high firing temperatures require expensive furnaces capable of achieving the high temperatures and high energy costs for firing.

SUMMARY OF INVENTION

It is therefore an object of this invention to provide an improved method of forming a porous inorganic membrane utilizing low processing temperatures.

A still further object of this invention is to provide such a method which requires less stringent time-temperature control during membrane processing by firing or otherwise.

It is a further object of this invention to provide such a method which enables use of membrane supports that can withstand only relatively low temperatures.

It is a further object of this invention to provide an improved porous inorganic membrane which can be formed on a support with a dissimilar coefficient of expansion.

A still further object of this invention is to provide such a method which can be accomplished using inexpensive furnaces and low energy costs.

This invention results in part from the realization that a truly effective porous inorganic membrane formed of refractory particles, that is, particles which are not significantly deformed or altered until a very high temperature is reached, can be achieved by mixing the refractory particles with a thermally reactive inorganic binder which reacts at a temperature substantially lower than that at which the refractory particles sinter so that a relatively low processing temperature can be utilized to bond the membrane coating.

In one aspect, the invention involves infiltrating a coating of refractory particles on a support with an inorganic binder. Preferably, conditions then are applied to the infiltrated, coated support that will cause the inorganic binder to react, but not cause the refractory particles to sinter.

In one embodiment, a coating of refractory particles which sinter at a first temperature is applied to a support to form a membrane precursor layer, followed by impregnation of this layer with a reactive inorganic binder, the inorganic binder reacting at a second temperature which is lower than the first temperature. The support then is heated to a temperature at least as high as the second temperature, but less than the first temperature, to react the inorganic binder, and the support is cooled to form the porous inorganic membrane from the refractory particles bonded to each other and to the support by the inorganic binder.

In one embodiment, the refractory particles are ceramic, and may be selected from the group consisting of silicon carbide, silicon nitride, silica, alumina, zirconia, zircon, mullite, cordierite, titania, spinel, or mixtures thereof.

In one embodiment the inorganic binder is an inorganic colloidal material, and may be selected from the group consisting of colloidal silica, alumina, zirconia, titania, ceria, yttria, tin oxide, silicon carbide, silicon nitride, and mixtures thereof.

In another embodiment, the inorganic binder is a soluble inorganic material dissolved in a liquid vehicle, and may be selected from the group consisting of nitrates, acetates, or other salts of aluminum or other metals, or polymers such as aluminum chlorhydrate, polyaluminum chloride, zirconium acetate, zirconyl nitrate or chloride, ammonium zirconium carbonate, or other zirconium polymers, sodium and potassium silicates, or alkoxides of aluminum, zirconia, titania, or silica. The inorganic material converts on firing to alumina, silica, titania, or zirconia.

In yet another embodiment, the inorganic binder ranges from 2.5 wt % to 200 wt %, preferably from 10 wt % to 100 wt %, relative to the weight of refractory particles.

DISCLOSURE OF PREFERRED EMBODIMENTS

Other objects, features and advantages will occur from the following description of preferred embodiments.

This invention may be accomplished by a method of forming a porous inorganic membrane having refractory particles bonded by a reactive inorganic binder. The inorganic binder reacts at a temperature which is lower than that at which the refractory particles sinter to accommodate relatively low processing temperatures. The refractory particles are particles which are not significantly deformed or altered until relatively high temperatures are achieved. In contrast, the inorganic binder reacts at a significantly lower temperature. The term "reacts" includes, sintering, chemically reacting, decomposing, or undergoing other chemical change, to bond via the binder the refractory particles to each other and to the support.

In one method of this invention, a suspension of refractory particles in a liquid vehicle is used to apply a coating of the refractory particles onto a porous support by slip casting or filtration. The coated support is dried to drive off the liquid vehicle and then impregnated with a liquid suspension or solution of the reactive inorganic binder. The support and impregnated coating are dried and heated to a temperature below that at which the refractory particles sinter or otherwise react, yet sufficiently high to react the inorganic binder. Upon cooling of the support, a strong, porous inorganic membrane is formed which has a porosity established largely by the size and packing characteristics of the refractory particles.

The suspension of refractory particles can be prepared in water, a polar solvent such as alcohols, or a nonpolar solvent such as hydrocarbons. In addition, the suspension can contain additives such as particle wetting agents, deflocculants, anti foam agents, a soluble organic polymer useful as an organic binder/viscosity modifier, an inorganic binder, and, if aqueous, acid or alkali for pH adjustment.

Many materials can be used for the refractory particles, including inorganic materials such as metals, glasses, and ceramics. Among refractory ceramic particles are silicon carbide, silicon nitride, silica, alumina, zirconia, zircon, mullite, cordierite, titania, other ceramic oxides, and mixtures thereof. The properties of preferred refractory particles include a particle size and particle size distribution appropriate for the coating process with the selected support and inertness during the processing of the membrane coating.

There are a number of thermally reactive inorganic binders which may be used in a method according to this invention, including inorganic colloidal materials, soluble inorganic materials, and reactive vapor phase compounds.

Inorganic colloidal materials which can be used as reactive inorganic binders include colloidal suspensions of the following: silica, alumina, zirconia, titania, ceria, yttria, tin oxide, silicon carbide, silicon nitride, and mixtures thereof. These colloidal materials are normally suspended in aqueous media, but can also be prepared in polar solvents such as alcohols. Particle size of the inorganic colloidal materials can be in the range of from about 3 to 200 millimicrons. Such inorganic colloidal materials typically react in the temperature range of 100° to 600° C.

Soluble inorganic materials are also suitable as reactive inorganic binders. Suitable soluble inorganic materials can include nitrates, acetates, or other salts of aluminum or other metals, or polymers such as aluminum chlorhydrate, polyaluminum chloride, zirconium acetate, zirconyl nitrate or chloride, ammonium zirconium carbonate, or other zirconium polymers, sodium or potassium silicates, or alkoxides of aluminum, zirconia, titania, or silica. On firing, such soluble inorganic materials convert to alumina, silica, titania, or zirconia. Such soluble inorganic materials typically react or decompose to the oxides in the temperature range of 100° to 600° C. Analogously, chemical precursors which decompose to silicon carbide or silicon nitride when fired in an oxygen-free atmosphere may be used.

Mixtures of inorganic colloidal materials, soluble inorganic materials, and inorganic colloidal materials with soluble inorganic materials may also be used. Such mixtures can be selected to yield chemically resistant inorganic binders on firing at moderately low temperatures.

Impregnation of the coated support can readily be performed by immersion of the coated support in a liquid suspension or solution of the reactive inorganic binder. Alternatively, the support can be contacted with the solution or suspension of the reactive inorganic binder in a process similar to slip casting in which only the coating of refractory particles, but not the support is brought in direct contact with the impregnating medium. In both impregnation means, it is necessary that the inorganic binder be of sufficiently small size so as to be absorbed into the coating of refractory particles. It is also preferred that the coating of refractory particles be stabilized so that the coating is not washed off the support during the impregnation process. Such coating stabilization can be achieved by using a polymeric binder in the mixture used to apply the coating of refractory particles. The polymeric binder after drying may be very slowly solubilized on rewetting. Or, the polymeric binder may be made insoluble when brought into contact with the inorganic binder. Or, a small amount of an inorganic binder which provides cohesive strength to the coating of refractory particles may be included in the suspension of refractory particles. For example, a small amount of colloidal silica added to the suspension of refractory particles will bond on drying of the coating, providing adequate strength to the coating to prevent resuspension of the refractory particles during the impregnation process. The proportion of the reactive inorganic binder relative to the amount of refractory particles can vary over a wide range. The preferred proportion depends on many factors, such as the densities of the respective materials, the degree of dissipation of the inorganic binder if it flows into the underlying support, the thickness of the coating, and the desired strength of the resultant fired membrane layer. The proportion of inorganic binder typically ranges from 2.5 wt % to 200 wt % of the weight of refractory particles, and is preferably 10 wt % to 100 wt %..

After coating the support with a mixture of refractory particles and impregnating with a thermally reactive inorganic binder in a liquid medium according to this invention, the impregnated, coated support is dried and heated or fired to bind the refractory particles to each other and to the support. The processing temperature is at least as high as a first temperature at which the inorganic binder reacts, but less than a second temperature at which the refractory particles sinter. By reaction of the inorganic binder is meant sintering, decomposing or otherwise reacting such that bonding by the binder of the refractory particles among themselves and to the support material occurs.

The above method describes a procedure in which the coating of refractory particles is impregnated with liquid containing the reactive inorganic binder. The reactive inorganic binder can also be infiltrated into the coating from the vapor phase. For example, chemical vapor deposition, plasma assisted chemical vapor deposition, or reaction bonding can be used to impregnate the coating of refractory particles with inorganic binder.

The membrane layer is coated onto a porous support. Preferably the support is thermally inert at the intended processing conditions for the membrane coating. The support can be of many structural configurations, including tubular, with the coating applied to the interior or the exterior of the tube. Alternatively, the support can be a multiple passageway monolith, with the coating applied to the surfaces of the passageways. As will be recognized by one of ordinary skill in the art, various support permeabilities, pore sizes and porosities will be appropriate depending upon the final application of the device. Suitable support materials include alumina, cordierite, mullite, silica, spinel, zirconia, silicon carbide, or other ceramics, carbon, stainless steel, nickel, and other metals.

Multiple layers of inorganic particles can be established to form a composite porous inorganic membrane. Such a membrane is particularly useful when the support on which the membrane is formed has a pore size substantially larger than the ultimate desired pore size of membrane. In the application of multiple coatings of inorganic particles to the support to overlie a first underlying layer, each successive coating preferably contains inorganic particles smaller in size than the inorganic particles in the previously coated and underlying layer. In the first underlying layer, the inorganic particles will be refractory particles bonded with a reactive binder; in the subsequent layers the inorganic particles may be refractory particles similarly bonded with a reactive binder, or may be solely inorganic colloidal materials.

There are several advantages for the formation of porous inorganic membranes according to the present invention. First, careful control of a firing time-temperature profile is not necessary because the processing temperature can be selected well above the temperature at which the reactive inorganic binder sinters or reacts to bond the refractory particles and well below the temperature at which the refractory particles sinter. Second, membrane supports with a relatively low thermal stability can be used for membranes prepared from refractory particles which sinter at a relatively high temperature. Third, dissimilar materials may be more readily used for the refractory particles and porous support. Fourth, low temperature processing results in lower cost production both through the use of inexpensive ovens and low energy cost.

The invention is illustrated by way of example, but without limitation, by the following embodiments.

EXAMPLE 1

A porous cordierite honeycomb monolith (Type EX47, Corning, Inc., Corning, N.Y.) from Corning, Inc. was used as a membrane support. The monolith was a cylinder with a one inch diameter and two inch length. The monolith had 60 full size, parallel, square passageways having a side dimension of 0.083 inch.

The total superficial surface area of the passageways, onto which the membrane was coated, was 0.28 square feet. The porosity of the cordierite was about 50%, and the mean pore size was about 12 microns.

The monolith passageways were coated by slip casting. The passageways were filled with a casting slip which was held in the passageways for a few seconds and drained. Excess slip was removed by blowing out with air.

A membrane coating was made with a slip of the following composition; all values are in weight percent:
Ultrafiltered water adjusted to pH 3 with nitric acid, 33.8%
20 micron alumina powder (Norton Company, Worcester, Mass., Code 7921), 31.4%
3 micron alumina powder (Norton Company, Code 7920, 15.7%
0.5 micron alumina powder (Norton Company, Code 7921), 15.7%

Nitric acid, to develop an electrostatic charge for deflocculation. (J. T. Baker, Phillipsburg, N.J., 70% aqueous solution), 0.3%

Polyethylene glycol, as an organic binder/viscosity modifier, (Union Carbide Corp., Danbury, Conn., Compound 20M) 2.9%

Silicone emulsion, as an antifoam agent, (Dow Corning, Midland, Mich., Additive 65), 0.1% k/o0

The water, powders, and acid were added to a polypropylene jar mill loaded half full with alumina milling media. The mixture was milled for 4 hours. After milling, the polyethylene glycol and silicone emulsion were added while mixing the slip with a magnetic stirrer. The slip was mixed until the polyethylene glycol was dissolved (30–60 minutes).

After coating by slip casting, the monolith was dried in air overnight then dried in an oven at about 175° F. for 2 hours, then about 225° F. for 1.5 hours, then about 275° for 30 minutes. After a second coating by slip casting to mask possible defects, the monolith was dried in air overnight, then dried in an oven at about 175° for 30 minutes, then about 225° F. for another 30 minutes.

After drying, the monolith was fired in an electric kiln to cone 018 (approximately 752° C.). The heating rate was about 3° C. per minute up to about 300° C. then about 7.5° C. per minute until the cone melted turning the kiln off. The kiln cooled naturally to room temperature overnight.

The membrane as observed under a 10X magnifier looked coherent and crack-free. However, the membrane was mechanically weak and powdery, and readily removed from the support by rubbing.

EXAMPLE 2

A second sample was made identically to the sample described in EXAMPLE 1, with the following additions. After the second membrane coating was dried, the membrane was impregnated with an inorganic sol binder. The procedure is similar to that of slip casting used for the coating of the refractory particles, except that the sol was held in the monolith passageways until the monolith structure became substantially saturated, but not so long as to resuspend or wash off the coating of refractory particles. The composition of the sol used for impregnation was as follows; all values are in weight percent:

20 nanometer colloidal silica sol, as an inorganic binder, (E.I. Du Pont de Nemours and Company, Wilmington, Del., Ludox HS 40) 50%

Ultrafiltered water, 50%

After impregnation, the monolith was dried in air for 3 hours then dried in an oven by gradually increasing the temperature from about 175° F. to about 250° F. in 25° F. increments every fifteen minutes. The oven temperature was held at 250° F. for 30 minutes then allowed to cool naturally.

After drying, the monolith was fired similarly to the sample described in EXAMPLE 1. The fired membrane was strongly coherent and strongly adherent to the monolith support. The colloidal silica strongly bonded the alumina particles at a temperature lower than the normal sintering temperature for alumina.

There were no obvious cracks in the membrane when observed under a 10X magnifier. The membrane was tested for water flux with ultrafiltered water and for rejection characteristics with a narrow-size distribution latex bead suspension. Water flux was 226 gallons per day per square foot of membrane area at about 25 psi applied pressure differential and 26° C. The rejection of 0.11 to 0.15 micron latex beads was 99.4%.

EXAMPLE 3

A third refractory coated sample was made as in EXAMPLE 1. The membrane coating was mechanically weak after firing to cone 018. A diluted silica sol, identical to that used in EXAMPLE 2, was used to impregnate the fired, weak, membrane coating. After impregnating, the monolith was dried in the air overnight then dried in an oven at about 150° F. for 2 hours, then about 200° F. for 1 hour, then about 225° F. for 45 minutes. After drying, the monolith was fired in an electric kiln to cone 020 (666° C.). The heating rate was, on average, approximately 2° C. to 3° C. per minute until the cone melted turning off the kiln. The kiln was allowed to cool to room temperature slowly.

After firing, the membrane was strongly coherent, strongly bonded to the monolith, and crack-free as observed under a 10X magnifier. The inorganic sol bonded the alumina at a temperature far below the normal sintering temperature of alumina.

The membrane was tested for water flux with ultrafiltered water and for rejection characteristics with a narrow-size-distribution latex bead suspension. Water flux was 364 gallons per day per square foot of membrane area at about 25 psi applied pressure differential and 26° C. The rejection of 0.11 to 0.15 micron latex beads was 96.3%.

EXAMPLE 4

A fourth sample was made identically to the sample described in EXAMPLE 3. Instead of silica, a 5 to 10 nanometer zirconia sol containing 20 weight percent zirconia (colloidal zirconia, acetate stabilized, Nyacol Products, Inc., Ashland, Mass.) was used to impregnate the membrane. After firing, the membrane was strongly coherent, strongly bonded to the monolith, and crack free as observed under a 10X magnifier. The membrane was tested for water flux with ultrafiltered water and for rejection of a narrow-size-distribution latex bead suspension. Water flux was 495 gallons per day per square foot of membrane area at about 25 psi applied pressure differential and 26° C. The rejection of 0.11 to 0.15 micron latex beads was 96.2%.

Other embodiments and equivalents will occur to those skilled in the art and are within the following claims:

What is claimed is:

1. A method of forming a porous inorganic membrane on a porous support, comprising:
    forming a coating of refractory particles which sinter at a first temperature on the support;
    impregnating the coating of refractory particles on the support with an inorganic binder which reacts at a second temperature, lower than the first temperature; and
    processing the support at a temperature at least as high as the second temperature and less than the first temperature to react the inorganic binder to form the porous inorganic membrane having the refractory particles bonded to each other and to the support by the inorganic binder.

2. The method of claim 1 in which the refractory particles are ceramic.

3. The method of claim 2 in which the ceramic is selected from the group consisting of silicon carbide, silicon nitride, silica, alumina, zirconia, zircon, mullite, cordierite, titania, and mixtures thereof.

4. The method of claim 1 in which the inorganic binder includes an inorganic colloidal material.

5. The method of claim 4 in which the inorganic colloidal material is selected from the group consisting of colloidal silica, alumina, zirconia, titania, ceria, yttria, tin oxide, silicon carbide, silicon nitride, and mixtures thereof.

6. The method of claim 1 in which the inorganic binder includes a soluble inorganic material.

7. The method of claim 6 in which soluble inorganic material is selected from the group consisting of nitrates, acetates, or other salts of aluminum or other metals, or aluminum chlorhydrate, polyaluminum chloride, zirconium acetate, zirconyl nitrate or chloride, ammonium zirconium carbonate, or other zirconium polymers, sodium or potassium silicates, or alkoxides of aluminum, zirconia, titania, or silica.

8. The method of claim 1 in which inorganic binder ranges from 2.5 wt % to 200 wt % relative to the weight of refractory particles.

9. The method of claim 1 in which inorganic binder ranges from 10 wt % to 100 wt % relative to the weight of refractory particles.

10. The method of claim 1 wherein the coating is dried prior to impregnating the coating with the inorganic binder.

11. The method of claim 1 wherein the coating is impregnated by applying a liquid containing the inorganic binder to the coating.

12. The method of claim 1 wherein the coating is impregnated with an inorganic binder delivered in a vapor phase.

13. The method of claim 1 wherein the refractory particle coating and the inorganic binder are slip cast onto the support.

14. A method of forming a porous inorganic membrane on a porous support, comprising:
applying a coating of refractory ceramic particles which sinter at a first temperature to the support;
impregnating the coating of refractory ceramic particles with a liquid containing an inorganic binder which reacts at a second temperature, lower than the first temperature;
drying the support; and
processing the support at a temperature at least as high as the second temperature and less than the first temperature to react the inorganic binder to form the porous inorganic membrane having the refractory particles bonded to each other and to the support by the inorganic binder.

15. The method of claim 14 in which the refractory ceramic particles are selected from the group consisting of silicon carbide, silicon nitride, silica, alumina, zirconia, zircon, mullite, cordierite, titania, and mixtures thereof.

16. The method of claim 14 in which the inorganic binder includes an inorganic colloidal material.

17. The method of claim 14 in which the inorganic binder includes a soluble inorganic material.

18. The method of claim 14 in which inorganic binder ranges from 10 wt % to 100 wt % relative to the weight of refractory ceramic particles.

* * * * *